United States Patent [19]

Hagiwara et al.

[11] Patent Number: 5,582,751
[45] Date of Patent: Dec. 10, 1996

[54] ARC WELDING MACHINE AND PLASMA CUTTING MACHINE

[75] Inventors: Seigo Hagiwara, Kawanishi; Kazuo Kimoto, Habikino, both of Japan

[73] Assignee: Matsushita Electric Industrial Co., Ltd., Osaka, Japan

[21] Appl. No.: 391,095

[22] Filed: Feb. 21, 1995

Related U.S. Application Data

[63] Continuation of Ser. No. 104,892, Aug. 12, 1993, abandoned.

[30] Foreign Application Priority Data

Aug. 25, 1992 [JP] Japan .................................. 4-225418
Dec. 22, 1992 [JP] Japan .................................. 4-340854

[51] Int. Cl.$^6$ .................................................. B23K 9/06
[52] U.S. Cl. .................................. 219/130.1; 219/130.4
[58] Field of Search ........................... 219/130.1, 130.4, 219/130.32, 130.33, 137 PS

[56] References Cited

U.S. PATENT DOCUMENTS

| | | | |
|---|---|---|---|
| 2,969,494 | 1/1961 | Davis | 219/130.1 |
| 3,249,735 | 5/1966 | Needham | 219/130.1 |
| 3,356,928 | 12/1967 | Parrish | 219/130.32 |
| 3,444,430 | 5/1969 | Needham | 219/130.4 |
| 3,530,359 | 9/1970 | Grist | 219/130.32 |
| 3,637,973 | 1/1972 | Ukai et al. | 219/137 PS |
| 3,818,177 | 6/1974 | Needham et al. | 219/137 PS |
| 4,950,864 | 8/1990 | Campiotti et al. | 219/130.4 |

FOREIGN PATENT DOCUMENTS

| | | | |
|---|---|---|---|
| 2740452 | 3/1979 | Germany | 219/130.4 |
| 63-20631B | 7/1981 | Japan . | |

OTHER PUBLICATIONS

"High Voltage Technology", pp. 38–39 and 49.
Patent Abstracts of Japan, vol. 9, No. 60 (M–364) (1783) 16 Mar. 1985 & JP–A–59 193 763 (Hitachi Seiko K.K.) 2 Nov. 1984.
Patent Abstracts of Japan, vol. 005, No. 158 (M–091) 12 Oct. 1981 & JP–A–56 086 679 (Matsushita Electric Ind. Co. Ltd.) 14 Jul. 1981.
Patent Abstracts of Japan, vol. 14, No. 140 (M–950) (4083) 16 Mar. 1990 & JP–A–02 006 063 (Mitsubishi Electric Corp.) 10 Jan. 1990.
Saiepour et al, "Arc Ignition Using DC Discharges", International Journal of Electronics, vol. 70, No. 2, pp. 467–474, Feb. 1991.

*Primary Examiner*—Clifford C. Shaw
*Attorney, Agent, or Firm*—Watson Cole Stevens Davis, P.L.L.C.

[57] ABSTRACT

In an arc welding machine and a plasma cutting machine, by connecting the output of a second DC power supply unit to a circuit fed by a first power supply unit, a DC high voltage from the second DC power supply unit is applied, during start, across an electrode and a base metal which are not in contact with each other, so that radiation noise can be reduced considerably and leakage of high frequency power from an extension cable can be eliminated to attain steady arc start.

8 Claims, 7 Drawing Sheets

ARC WELDING MACHINE AND PLASMA CUTTING MACHINE

This application is a continuation of application Ser. No. 08/104,892, filed Aug. 12, 1993 (abandoned).

BACKGROUND OF THE INVENTION

The present invention relates to an arc welding machine and a plasma cutting machine wherein an arc is generated between an electrode and a base metal in contactless fashion and so electric wave interference is reduced to drastically improve the arc start characteristic when an extension cable is used.

Figure 4:
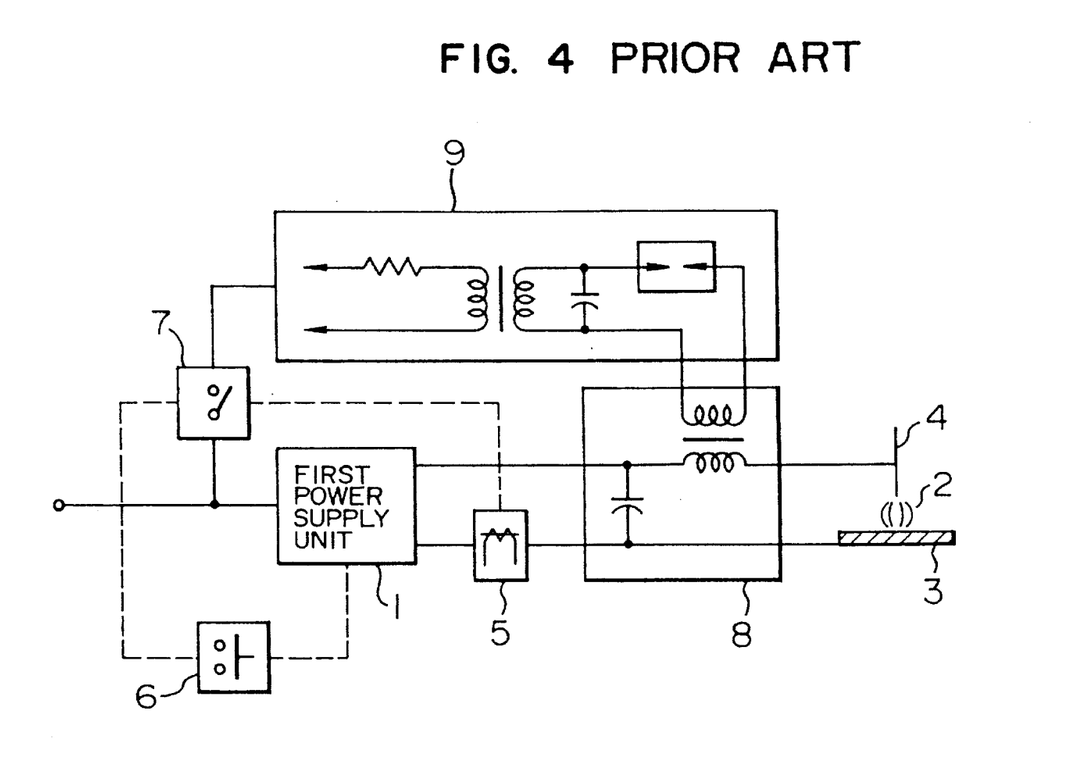
FIG. 4 shows a conventional example of an arc welding machine in which an AC power supply or a DC power supply is used as the first power supply unit.
Figure 5:
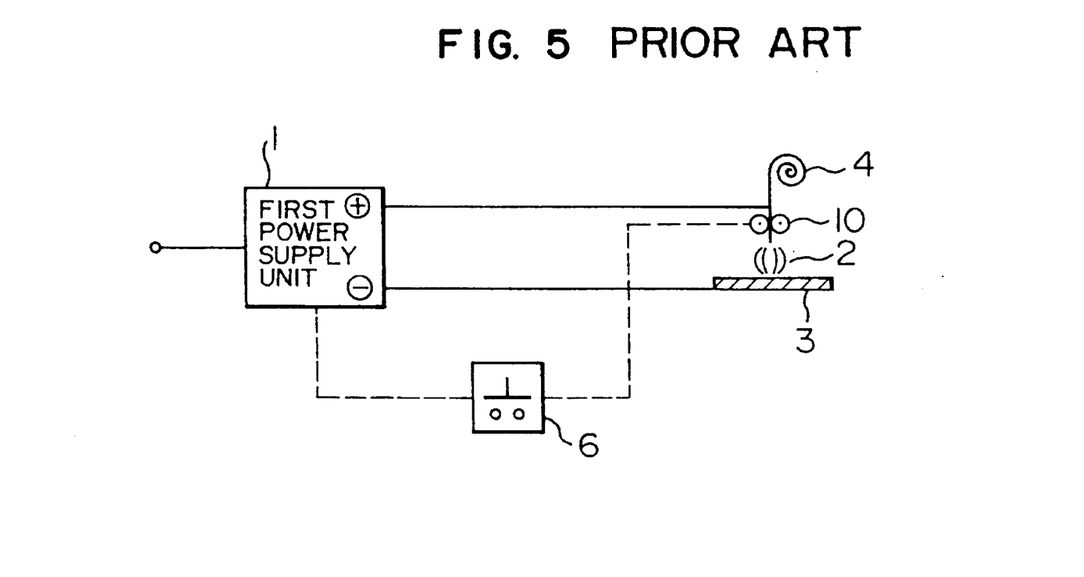
FIG. 5 shows a conventional example of a consumable electrode arc welding machine.

Conventionally, in an inconsumable electrode arc welding machine and a plasma cutting machine, high frequency voltage is applied across an electrode and a base metal only upon arc start to effect arc start in contactless fashion. A construction of this type of welding machine and plasma cutting machine will be described hereunder with reference to FIG. 4. In the Figure, when a start switch 6 is depressed, a contact 7 is closed because an arc generation detector 5 is not in operation, and a high frequency generator 9 is operated to feed power to a coupling unit 8. As a result, the coupling unit 8 superimposes high frequency power on power fed from a first power supply unit 1 across an electrode 4 and a base metal 3. Thus, a discharge is initiated in contactless fashion and then an arc is started by power fed from the first power supply unit. The contact 7 is opened by a signal from the arc generation detector 5 to stop the operation of the high frequency generator 9. In the case of a consumable electrode arc welding machine as shown in FIG. 5, on the other hand, when a start switch 6 is depressed, a first power supply unit delivers the output and a feed unit 10 of a consumable electrode (hereinafter called a wire) is operated, so that the wire touches the base metal to generate Joule heat by which the wire tip is fused off to ignite an arc, thus initiating welding.

Figure 11:
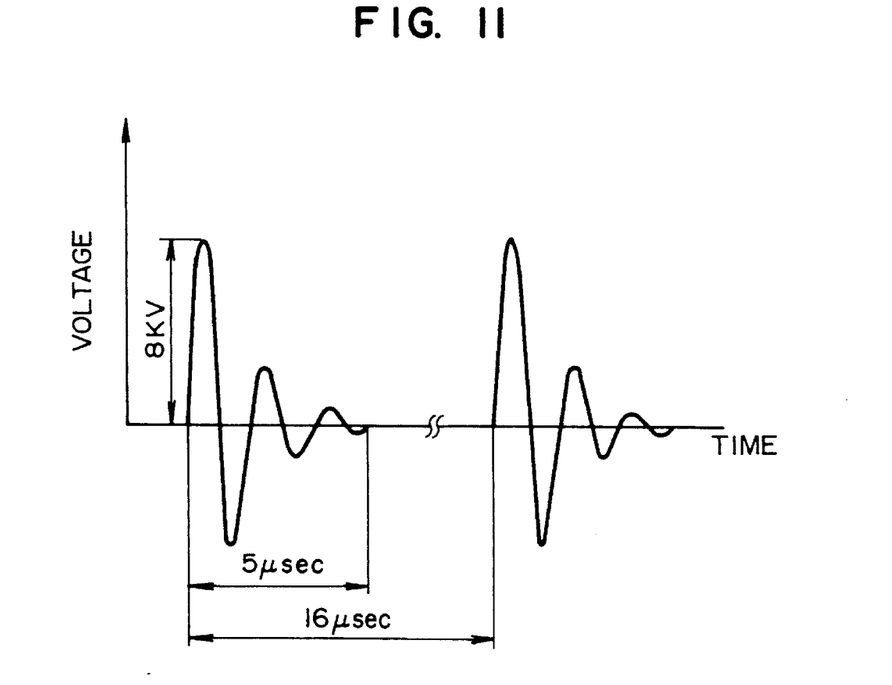
FIG. 11 shows a high frequency voltage application waveform according to a conventional example.
Figure 12:
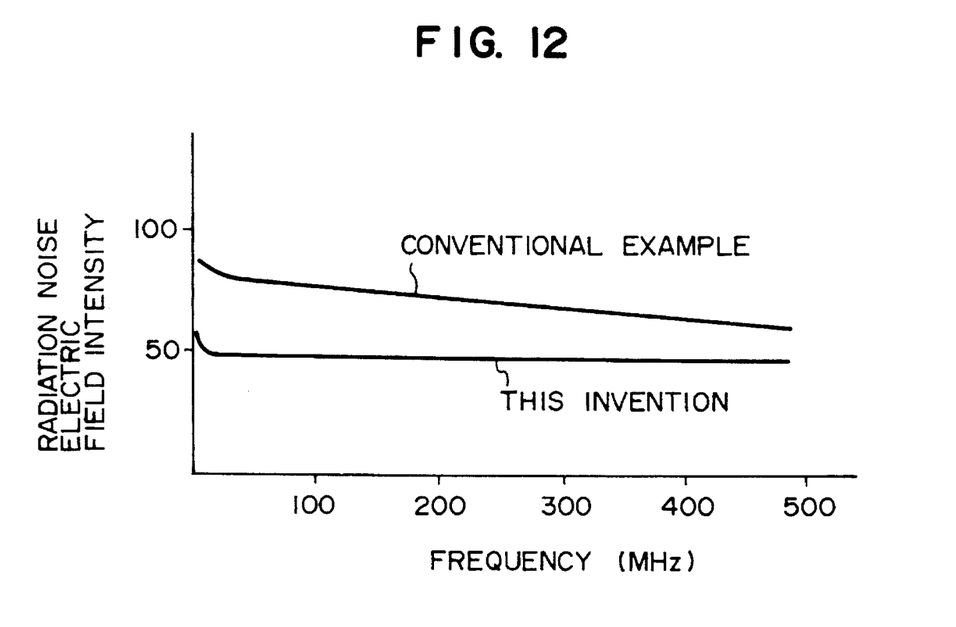
FIG. 12 is a comparative graph of radiation noise electric field intensity according to the invention and the conventional example.
Figure 13:
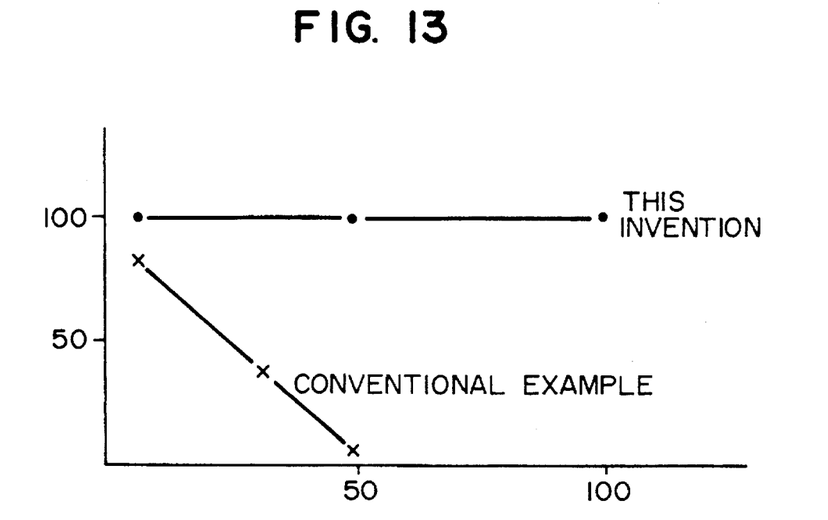
FIG. 13 is a comparative graph of arc start characteristic obtained when an extension cable is used in inconsumable electrode arc welding machines according to the invention and the conventional example.
Figure 14:
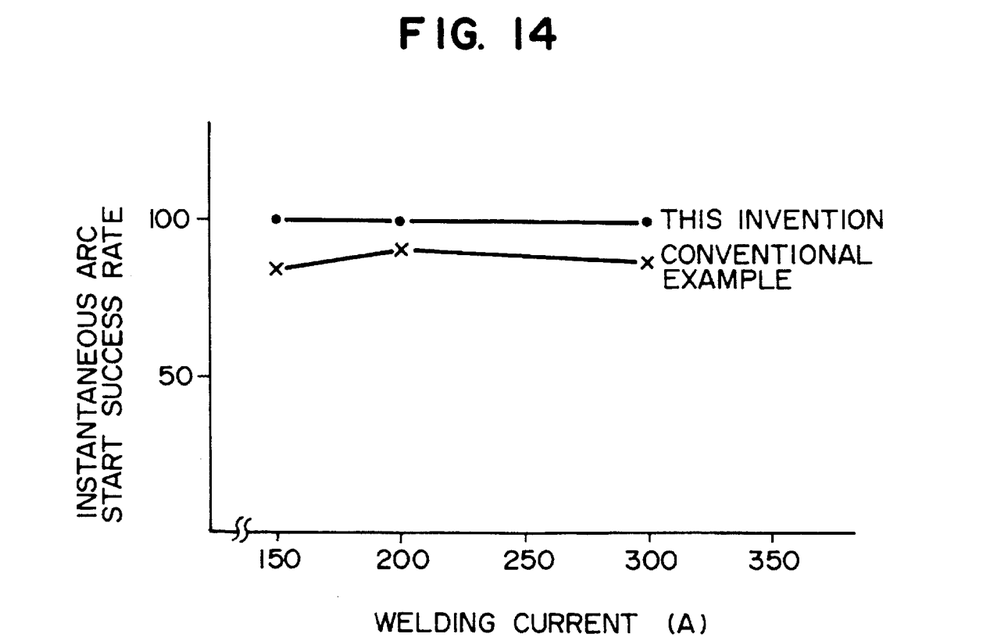
FIG. 14 is a comparative graph of arc start characteristics obtained in consumable electrode arc welding machines according to the invention and the conventional example.

In the conventional inconsumable electrode arc welding machine, arc start is effected by high frequency power and consequently, a high frequency voltage as shown in FIG. 11 is applied across the electrode and the base metal. At that time, radiation noise electric field intensity reaches up to about 70 dBµV as shown in FIG. 12. Accordingly, electric wave interference was caused which interfered with neighboring televisions, radios or electronic apparatus, giving rise to breakdown of them in an extreme case, or the high frequency was so intensive that the electrode surface was roughened to deteriorate the arc start characteristic. Further, since the center frequency was a high frequency of about 1 MHz, the high frequency leaked on the way when a secondary side cable was extended and could not reach the tip of a torch, resulting in a failure to start an arc in the case of an extension cable of 50 m or more as shown in FIG. 13. Many problems as above have hitherto been encountered. In the case of the consumable electrode arc welding machine, on the other hand, an effort has been made to raise the current rise speed during start and as a result, the instantaneous arc start rate has been raised to about 90% but for promotion of FA, it is necessary to increase this rate to 100%. In the conventional techniques, the influence of slag (insulating material) adhered to the wire tip upon the start characteristic was difficult to avoid and it appeared that experimental data of FIG. 14 showed the limit of the contact start system (conventional technique).

SUMMARY OF THE INVENTION

To solve the above problems, according to the present invention, a first power supply unit is provided between an electrode and a base metal and a second DC power supply unit having a descending characteristic and connected to an output of the first power supply unit to apply a high voltage across the electrode and the base metal, whereby the high voltage from the second DC power supply unit is applied across the electrode and the base metal during arc start and the application of the high voltage from the second DC power supply unit is stopped after arc generation. Alternatively, during arc start, a DC high voltage from the second DC power supply unit may be applied across the electrode and the base metal and after arc generation, power may be fed from the first and second power supply units.

With the above construction, by supplying the high voltage from the second DC power supply unit across the electrode and the base metal during arc start, an air gap between the electrode and the base metal is caused to undergo dielectric breakdown to generate a corona discharge and then an arc is triggered to effect arc start in contactless fashion.

DESCRIPTION OF THE PREFERRED EMBODIMENTS

Figure 1:
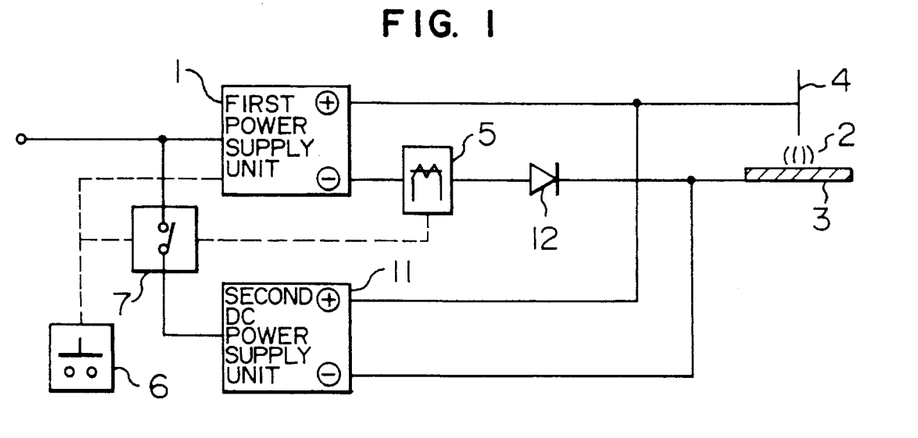
FIG. 1 shows an arc welding machine or a plasma cutting machine according to the present invention in which a DC power supply is used as the first power supply unit.
Figure 2:
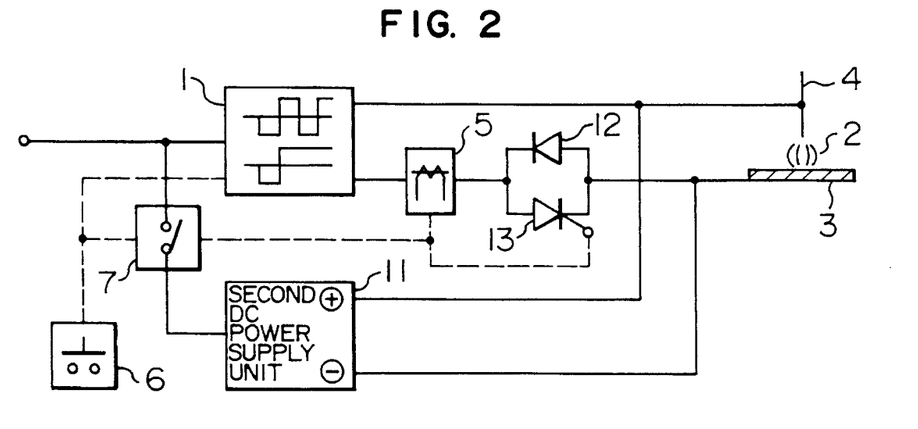
FIG. 2 shows an embodiment of the arc welding machine according to the invention wherein an AC power supply and a DC power supply which inverts the polarity upon start are used as the first power supply unit.
Figure 3:
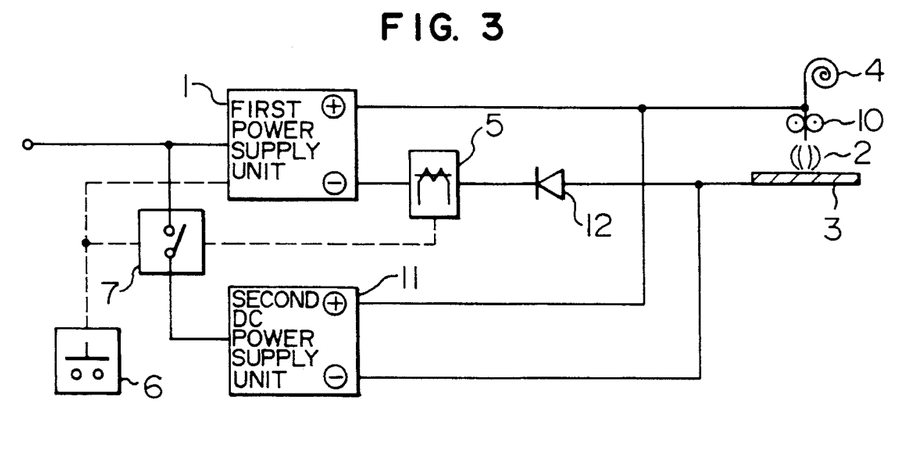
FIG. 3 shows an embodiment of a consumable electrode arc welding machine according to the invention in which a DC power supply is used as the first power supply unit.
Figure 6:
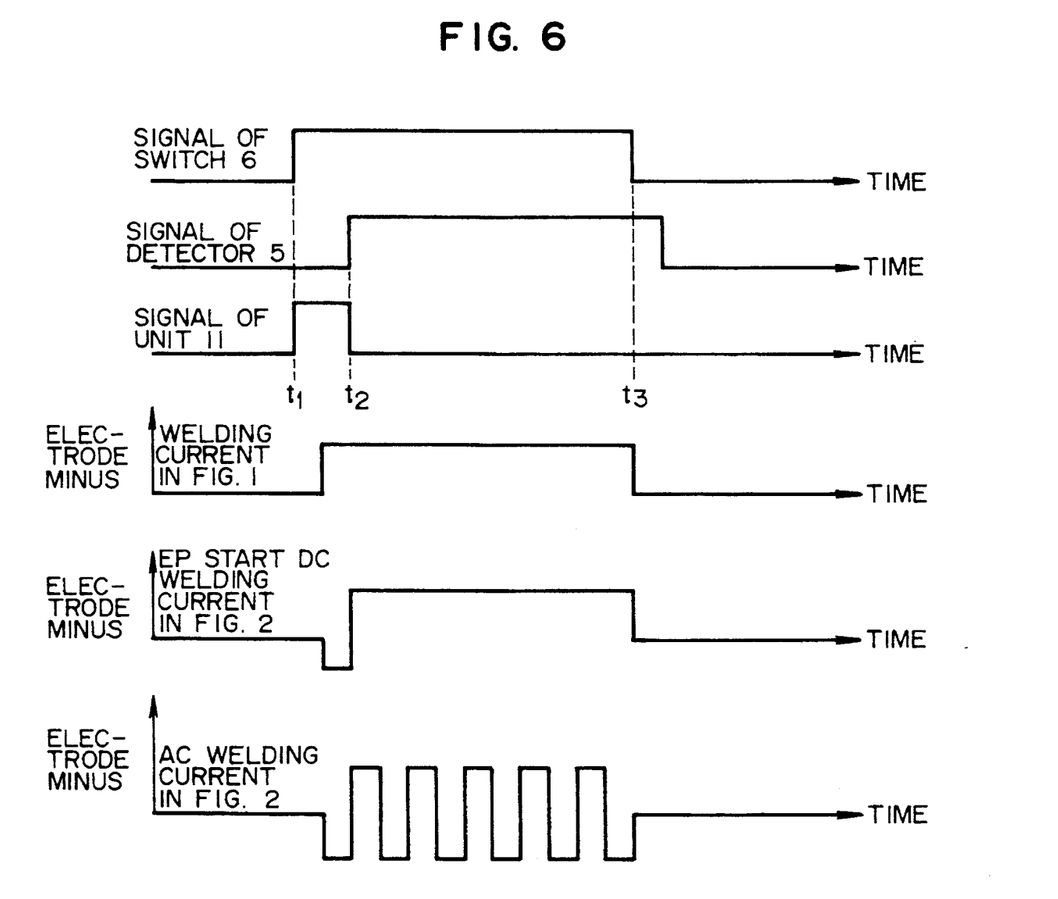
FIGS. 6, 7 and 8 show DC high voltage application timing charts according to the invention.
Figure 9:
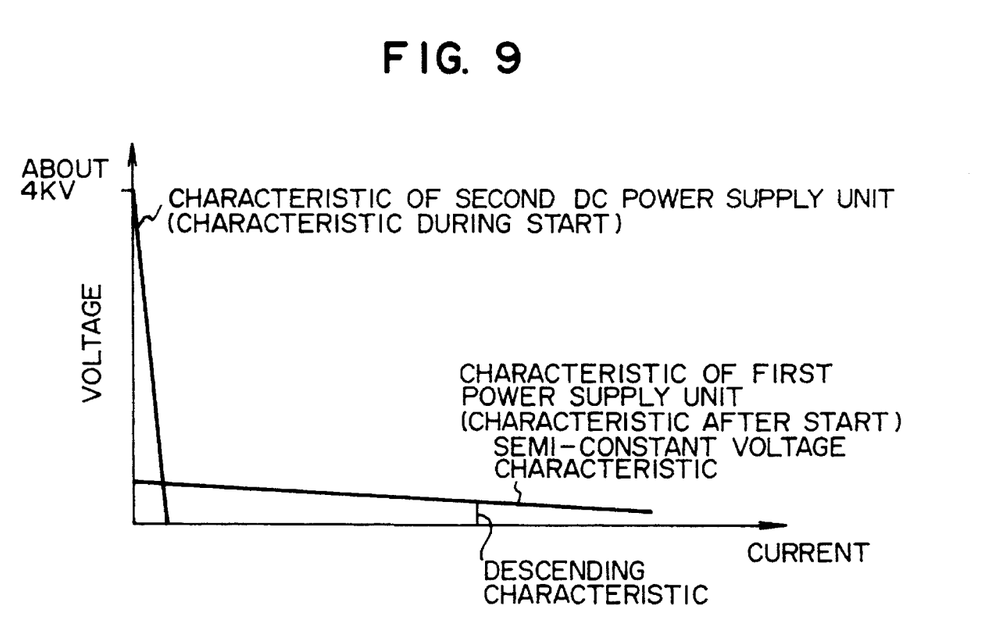
FIG. 9 shows an arc start characteristic graph according the invention.
Figure 10:
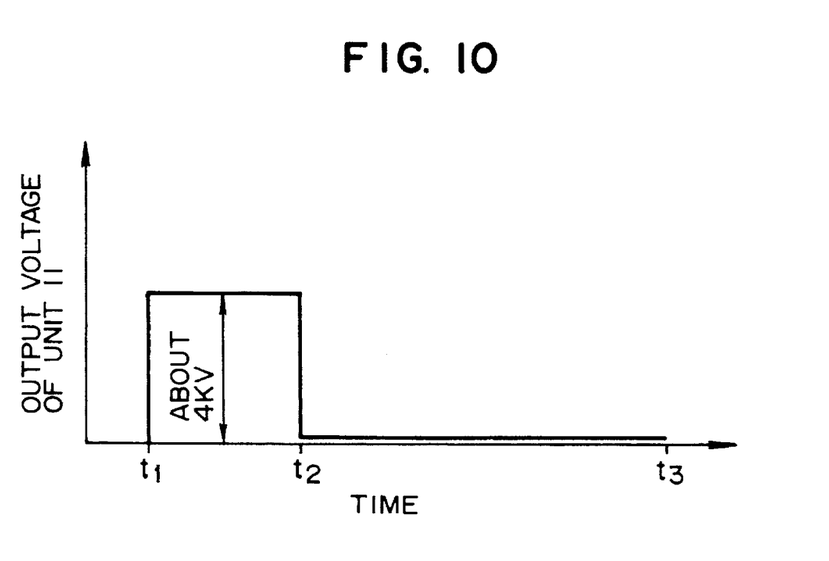
FIG. 10 shows a DC high voltage application waveform according to the invention.

FIG. 1 shows a main circuit of an inconsumable electrode arc welding machine in which the first power supply unit 1 is a DC power supply. FIG. 2 shows a main circuit when the first power supply unit is an AC power supply. FIG. 3 shows a main circuit when the electrode in FIG. 1 is replaced with a consumable electrode. In FIG. 1, 1 to 7 designate the same components as those in the conventional example of FIG. 4. As shown in FIGS. 1–3, the first and second power supply units are connected to the electrode and the base metal without an intermediate switch. A non-contact circuit is a circuit that does not have contact switches. Reference numeral 11 designates a second DC power supply unit of a descending characteristic type which is adapted to apply a high voltage. Reference numeral 12 designates a rectifying element for blocking DC high voltage. The output of the second DC power supply unit is connected to an output of the first power supply unit, and the rectifying element 12, which blocks the application of high voltage to the first power supply unit in order that the high voltage output of the second DC power supply unit can be applied only across electrode 4 and base metal 3, is connected to and inserted in the output of the first power supply unit. In the above construction, when start switch 6 is depressed, the second DC power supply unit 11 is started through contact 7 and a DC high voltage of about 4 KV for arc start is supplied across the electrode 4 and the base metal 3. At the same time, DC power for formation of a stationary arc from first DC power supply unit 1 is supplied across the electrode 4 and the base metal 3. Through this feeding operation, a gap between the electrode 4 and the base metal 3 is caused to undergo dielectric breakdown by the DC high voltage to thereby generate a corona discharge which in turn shifts to an arc. As shown in FIG. 6, the time for feeding power from the second DC power supply unit 11 begins with t1 at which the start switch 6 is operated and ends in t2 at which arc generation detector 5 is operated. FIG. 9 shows an operational characteristic which begins with arc start and proceeds thereafter. Power fed from the second DC power supply unit and having a descending characteristic is applied across the electrode 4 and the base metal 3 during no load, and after arc shift, power fed from the first power supply unit and having a descending characteristic or semi-constant voltage characteristic is applied. Accordingly, arc start can be effected in contactless fashion between the electrode 4 and the base metal 3. Results of experiments conducted with the welding machine of the above construction under the following conditions demonstrated that a DC high voltage waveform contained no harmonics as shown in FIG. 10 and therefore noise electric field intensity pursuant to the EMC test method was decreased by about 30 d μV as shown in FIG. 12 in comparison with that in the conventional example. In addition, as shown in FIG. 13, the instantaneous arc start rate was improved considerably as compared to the conventional one. The difference becomes remarkable as the length of an extension cable increases.

Experimental Conditions

Electrode tungsten containing thorium, 2.4 mm φ

Argon gas 5 l/min

Current 50 A

Distance between electrode and base metal 3 mm

The number of tests 100

Torch switch ON/OFF period 2-second ON/13-second OFF

Figure 8:
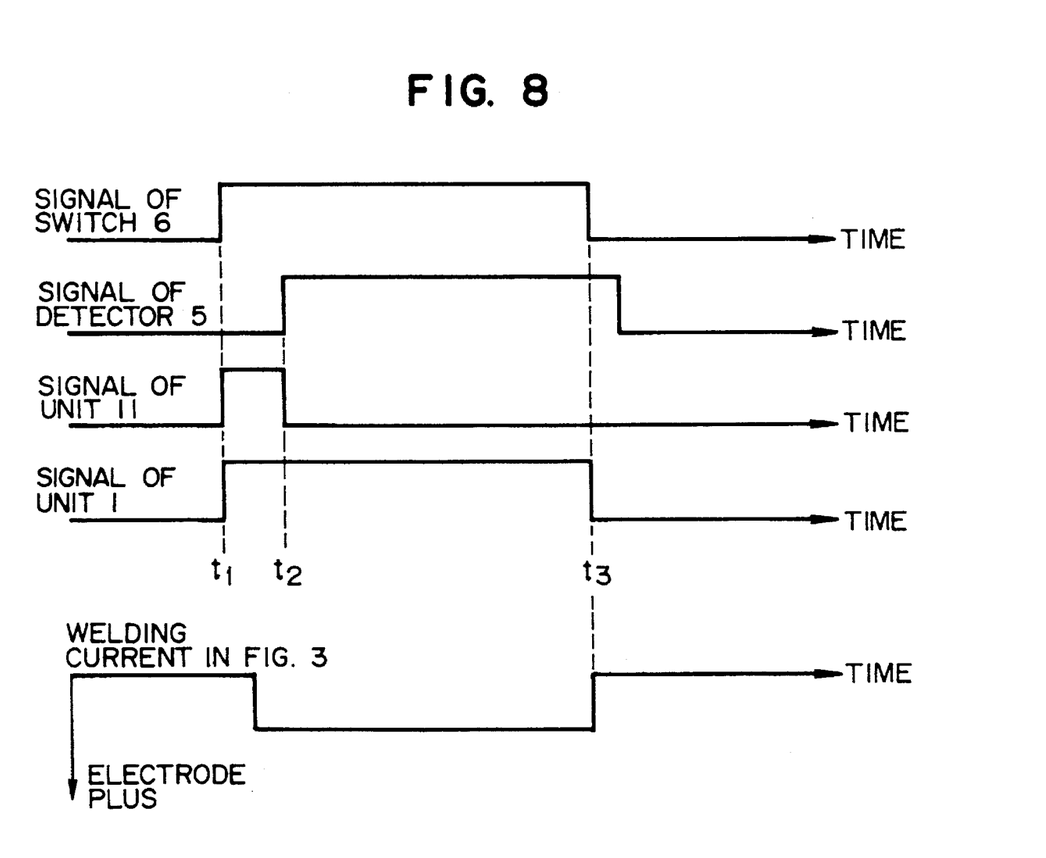

FIG. 2 shows the case where an AC power supply and a DC power supply which switches the polarity only when starting are used as the first power supply unit, and it can be understood easily that the same arc start mechanism as that in the case of FIG. 1 where the first power supply unit is the DC power supply prevails as will be seen from FIG. 6 when only the start phase is taken into account. Reference numeral 13 designates a unidirectional controllable rectifying element which is rendered to be conductive by receiving a signal from the arc generation detector 5 to supply power of electrode minus across the electrode 4 and the base metal 3. Similar effects could be obtained even when the welding load was replaced with cutting load in the embodiment. On the other hand, an embodiment of a consumable electrode arc welding machine shown in FIG. 3 will be described. As shown in FIG. 8, when start switch 6 is depressed, no load voltage of the first DC power supply unit is generated and at the same time a wire feed unit 10 is operated to feed a wire toward the base metal. A DC voltage of about 4 KV fed from the second DC power supply unit is applied across wire 4 and base metal 3. Reference numeral 12 designates a rectifying element for blocking which permits the DC high voltage to be applied only across the wire and the base metal. Accordingly, as the wire is fed toward the base metal, a discharge is initiated when the distance between the wire tip and the base metal reaches about 2 mm and it shifts to a stationary arc because the first DC power supply unit is also in operation. Being different from the conventional machine in which current conduction is caused by bringing the wire tip into contact with the base metal and arc start is effected by resulting Joule heat, the contactless start system of the present invention could completely eliminate the influence of slag adhesion to the wire tip and problems raised when the wire contacts the base metal, and results of an arc start test proved that the instantaneous arc start rate could be improved up to 100% as shown in FIG. 14.

| | Experimental Conditions | | | |
|---|---|---|---|---|
| (Cur.) | (Volt.) | (Wire dia.) | ($CO_2$ gas) | (Tip/base metal dist.) |
| 120 A | 19 V | 1.2 mmφ | 15 l/min | 15 mm |
| 200 A | 24 V | 1.2 mmφ | 15 l/min | 15 mm |
| 300 A | 32 V | 1.6 mmφ | 15 l/min | 20 mm |

The number of tests 100 for each case
Torch switch ON/OFF period 2-second ON/13-second OFF Torch is vertical to base metal. Start is repeated with the torch stopped.

Figure 7:
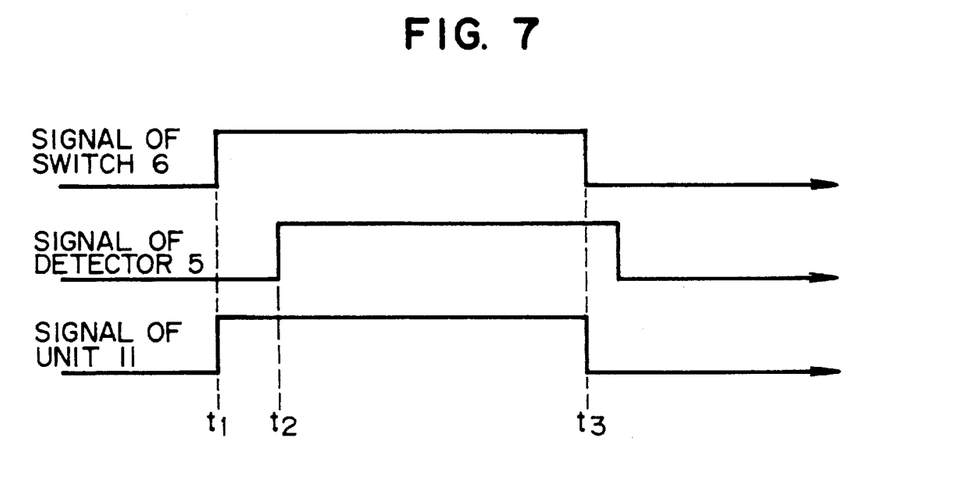

While in the foregoing embodiments the second DC power supply unit is stopped by means of the contact 7 simultaneously with the detection of arc generation, power can be fed from both the first power supply unit and the second DC power supply unit after the generation of arc as shown in FIG. 7. In essentiality, it suffices that arc start is effected by a DC high voltage fed from the second DC power supply unit 11.

As is clear from the foregoing embodiments, according to the present invention, a DC high voltage fed from the second DC power supply unit having the descending characteristic is applied across the electrode and the base metal upon arc start to cause a gap between the electrode and the base metal to undergo dielectric breakdown and trigger an arc following a corona discharge, thereby ensuring that arc start can be effected without contacting the electrode and the base metal. Through this, radiation noise during no load can be reduced. In addition, since the arc start is carried out with the DC high voltage, leakage from an extension cable can be prevented and the arc start can be done steadily even when the length of the extension cable is made to be long. As described above, according to the invention, an arc welding machine (of inconsumable electrode type and consumable electrode type) and a plasma cutting machine can be provided wherein radiation noise during no load can be eliminated and steady arc start can be ensured even with the extension cable prolonged.

We claim:

1. A power supplying apparatus for powering an electrode and a base metal in one of an arc welding machine and a plasma cutting machine, said power supplying apparatus comprising:

first power supply means, connected to said electrode and said base metal, for supplying power between said electrode and said base metal;

second power supply means, having a descending characteristic and connected to an output of said first power supply means, for applying a high voltage between said electrode and said base metal;

applying means for applying the high voltage from said second power supply means between said electrode and said base metal during start of arc, and after generation of arc, for stopping said second power supply means from applying the high voltage and starting said first power supply means to supply the power between said electrode and said base metal; and a rectifying element connected to the output of said first power supply means so that the high voltage from said second power supply means is applied between said electrode and said base metal at a polarity equal to a polarity of the output of said first power supply means during no load.

2. A power supply apparatus according to claim 1, wherein said electrode comprises a consumable electrode.

3. A power supply apparatus according to claim 1, wherein said rectifying element comprises a silicon controlled rectifier.

4. A power supplying apparatus for powering an electrode and a base metal in one of an arc welding machine and a plasma cutting machine, said power supplying apparatus comprising:

first power supply means, connected to said electrode and said base metal, for supplying power between said electrode and said base metal;

second power supply means, having a descending characteristic and connected to an output of said first power supply means, for applying a high voltage between said electrode and said base metal;

applying means for applying the high voltage from said second power supply means between said electrode and said base metal during start of arc and, after generation of arc, for feeding power from said first power supply means and said second power supply means between said electrode and said base metal; and a rectifying element connected to the output of said first power supply means so that the high voltage from said second power supply means is applied between said electrode and said base metal at a polarity equal to a polarity of the output of said first power supply means during no load.

5. A power supply apparatus according to claim 4, wherein said electrode comprises a consumable electrode.

6. A power supply apparatus according to claim 4, wherein said comprises a silicon controlled rectifier.

7. A power supply apparatus for powering an electrode and a base metal in one of an arc welding machine and a plasma cutting machine, said power supply apparatus comprising:

first power supply means, connected to said electrode and said base metal, for supplying power between said electrode and said base metal;

second power supply means, having a descending characteristic and connected to an output of said first power supply means, for applying a high voltage between said electrode and said base metal; and applying means for applying the high voltage from said second power supply means between said electrode and said base during start of arc, and after generation of arc, for stopping said second power supply means from applying the high voltage and starting said first power supply means to supply the power between said electrode and said base metal, wherein the second power supply means is connected to the electrode and base metal without an intermediate switch.

8. A power supply apparatus for powering an electrode and a base metal in one of an arc welding machine and a plasma cutting machine, said power supply apparatus comprising;

first power supply means, connected to said electrode and said base metal, for supplying power between said electrode and said base metal;

second power supply means, having a descending characteristic and connected to an output of said first power supply means, for applying a high voltage between said electrode and said base metal; and applying means for applying the high voltage from said second power supply means between said electrode and said base metal during start of arc and, after generation of arc, for feeding power from said first power supply means and said second power supply means between said electrode and said base metal, wherein the second power supply means is connected to the electrode and the base metal without an intermediate switch.

* * * * *